US006917033B2

(12) United States Patent
Hendriks et al.

(10) Patent No.: US 6,917,033 B2
(45) Date of Patent: Jul. 12, 2005

(54) PASSIVE TOUCH-SENSITIVE OPTICAL MARKER

(75) Inventors: Ferdinand Hendriks, Morgan Hill, CA (US); John P. Karidis, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 10/270,976

(22) Filed: Oct. 15, 2002

(65) Prior Publication Data

US 2004/0069934 A1 Apr. 15, 2004

(51) Int. Cl.[7] .............................. G06M 7/00; H01J 40/14
(52) U.S. Cl. ...................................... 250/221; 345/179
(58) Field of Search ................................ 250/221, 549, 250/559.29; 345/156, 179, 173, 175, 177; 178/18.01, 18.09; 356/3.01, 141.1; 341/5; 358/478

(56) References Cited

U.S. PATENT DOCUMENTS 5,525,764 A * 6/1996 Junkins et al. ............ 178/18.01
6,208,330 B1 * 3/2001 Hasegawa et al. .......... 345/173

FOREIGN PATENT DOCUMENTS

| JP | 57 178531 A | 11/1982 |
| WO | WO 01/63549 A1 | 8/2001 |

OTHER PUBLICATIONS

U.S. Appl. No. 09/644,980, filed Aug. 18, 2000, Hendriks et al.
D. Bullock et al., entitled "Real–Time Tracking for Visual Interface Applications in Cluttered and Occluding Situations," 8 pages.
C. Müller–Tomfelde et al., entitled "Modeling and Sonifying Pen Strokes on Surfaces," Proceedings of theCOST G–6 Conference on Digital Audio Effects (DAFX–01), Limerick, Ireland, 5 pages, Dec. 6–8, 2001.
M.E. Munich et al., entitled "Visual Input for Pen–Based Computers," IEEE Proceedings of ICPR '96, pp. 33–37.
J.A. Brotherton et al., entitled "Supporting Capture and Access Interfaces for Informal and Opportunistic Meetings," 8 pages.
W. Taylor, entitled "The Future of the Office," PC Computing, 8(1), pp. 190–200, Jan. 1995.

* cited by examiner

*Primary Examiner*—Thanh X. Luu
*Assistant Examiner*—Seung C. Sohn
(74) *Attorney, Agent, or Firm*—Rafael Perez-Pineiro; Ryan, Mason & Lewis, LLP

(57) ABSTRACT

A passive optical marker for use in accordance with an electronic whiteboard system that selectively allows a reflector associated with the optical marker to be exposed to a light emitting source. Thus, the optical marker of the present invention selectively provides information pertaining to the location of the optical marker and pen-up/pen-down states.

19 Claims, 6 Drawing Sheets

PASSIVE TOUCH-SENSITIVE OPTICAL MARKER

FIELD OF THE INVENTION

The present invention relates generally to electronic whiteboard systems and, more particularly, to optical markers for use in such electronic whiteboard systems.

BACKGROUND OF THE INVENTION

An electronic whiteboard system is a processor-based computing system used to input and output information associated with a software application running on the system. Typically, in accordance with such a system, one or more users "write" on the whiteboard using an electronic writing instrument or optical marker, such as a lightpen. The lightpen permits the user to write with "electronic ink." Electronic ink is the term given to writing that is electronically captured from and/or electronically projected on the whiteboard without using physical ink. A user's writing, as well as any other desired information, is displayed on the whiteboard which is viewable by the one or more users. The data entered on the whiteboard may then be stored for subsequent use by the application being run on the system. Examples of such whiteboard systems are: Ideaboard by 3M Inc.; e-Beam by Electronics for Imaging, Inc.; SoftBoard by Microfield Graphics, Inc.; SMART Board by Virtual Ink Inc.; and Liveboard, The Office of the Future: Xerox PARC, Wendy Taylor, PC Computing, pp. 192, January 1995.

Whether a single stand-alone system or a collaborative system (a collaborative whiteboard system is a distributed computing system which includes two or more individual electronic whiteboard systems in communication with each other while running a collaborative application), a typical electronic front-projection whiteboard system, as illustrated in FIG. 1A, is comprised of a whiteboard screen 2, an optical marker or lightpen 4, a fixed-position projector 6, a fixed-position camera 8 and a processing system 10. In such a system, the function of projecting images representing a user's writing on the whiteboard screen 2, in accordance with the lightpen 4, is performed by the fixed-position projector 6. As shown in FIG. 1A, the projector 6 has its own imaging optics 7 associated therewith. The fixed-position camera 8, aimed at the whiteboard screen 2 and the lightpen 4, captures an image of the whiteboard and the light emitted by a lamp associated with the lightpen. Like the projector 6, the camera 8 has its own imaging optics 9 associated therewith. Suitable optical and electronic filtering assure that only the lightpen is sensed among possible background clutter and distractions such as other bright objects. As is known, the presence and location of the lamp of the lightpen in the field of view of the camera may be estimated by various signal processing techniques.

The images projected by the projector on the screen, representing the user's writing strokes, are derived from a display screen buffer. The contents of the display screen buffer depend on optical screen marking events such as those generated by the lightpen. The visual effect that the user's strokes are physically being written on the whiteboard, whenever the lightpen is in the pen-down state, is achieved by the projector projecting the trajectory of the optical marker or lightpen path onto the whiteboard.

As is known, the processing system 10 includes processor and memory resources for coordinating the functions performed by the whiteboard screen 2, the optical marker 4, the projector 6 and the camera 8. Accordingly, the system must accurately sense the location of the optical marker on the whiteboard and then project its writing actions onto the whiteboard. One method for accomplishing these tasks is as follows. The camera and its imaging optics are aimed at the whiteboard in order to capture the optical emission from the lightpen. The captured position of the light must then be transformed such that the projected writing trace generated by the projector appears at the tip of the lightpen as it writes. The transformation used to achieve this goal depends on many factors such as the settings and location of the imaging optics of the projector, and the settings and location of the imaging optics of the camera.

A conventional rear-projection whiteboard system is illustrated in FIG. 1B. The system is comprised of a whiteboard screen 2', an enclosure 3, a lightpen 4', a reflecting mirror 5, a fixed-position projector 6', a fixed-position camera 8' and a processing system 10'. The components and their functions in the rear-projection system in FIG. 1B are essentially the same as those in the front-projection system in FIG. 1A, as described above, with the following exceptions. In the front-projection system, the user is on the same side of the whiteboard screen as the projector, while in the rear-projection system, the user and the projector are on opposite sides of the screen. Also, the screen 2' in the rear-projection system is typically translucent so that the lightpen 4' can be tracked by the camera 8', via the reflecting mirror 5, and so that the user on one side of the screen can view the images projected on the other side of the screen by the projector 6', via the mirror 5. Like the conventional front-projection system, the projector and camera of the rear-projection system each have their own separate imaging optics 7' and 9', respectively.

A problem associated with conventional whiteboard systems is that they require either a sophisticated special-purpose digitizing whiteboard, or a special optical marker that requires electrical power, or both. Since the conventional optical markers contain electronics, these markers tend to be expensive and configured to work with a particular electronic whiteboard system. Attempts have been made to eliminate the need for an optical marker altogether, such as, for example, tracking the tip of a writer's finger. However, this approach suffers due to difficulty in detecting the up/down state of the "writer's finger."

Thus, it would be highly desirable to provide a simplified, less expensive and easier to use optical marker for whiteboard system applications. In doing so, all complexity and cost is concentrated in a single device which performs the functions of a projector, camera and illuminator.

SUMMARY OF THE INVENTION

The present invention provides a passive optical marker that selectively allows a reflector associated with the optical marker to be exposed to a light emitting source. Thus, the optical marker of the present invention selectively provides, for example, information pertaining to the location of the optical marker and pen-up/pen-down states.

In one aspect of the present invention, an optical marker comprises a reflector for reflecting light emitted from a light emitting source associated with an electronic whiteboard system when exposed to the source, wherein the reflector is selectively allowed to be exposed to light emitted by the light emitting source. The reflector may be selectively exposed by a patch and one or more side walls, wherein the patch is operatively connected to the one or more side walls such that when pressure is applied to the patch, the one or more side walls are forced away from the reflector thereby exposing the reflector to light of the light emitting source.

In another aspect of the present invention, the reflector of the optical marker is selectively exposed to light as a result of contact with a data entry surface of an electronic whiteboard system when the user enters data. The optical marker may be configured to be worn on a finger of a user or connected to a pen.

In yet another aspect of the present invention, a method of writing in accordance with an electronic whiteboard system is provided wherein light is emitted from a light emitting source toward a data entry surface and a reflector device is used to reflect at least a portion of the light, and wherein the user has the ability to selectively allow a reflector associated with the reflector device to be exposed to the light emitted by the light emitting source.

One advantage of the optical marker in accordance with the present invention is that it eliminates the need for a power supply and other electrical components within the housing of the optical marker. Thus, all functional electronics are housed within the camera and/or projector rather than in the optical marker. The present invention makes it much easier to track the location and the pen-up/pen-down state, by requiring the user to operate an inexpensive reflective device that can either be worn over a finger or operated as a familiar lightpen configuration. The optical marker is unpowered and may essentially be an inexpensive throw-away item.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1A:
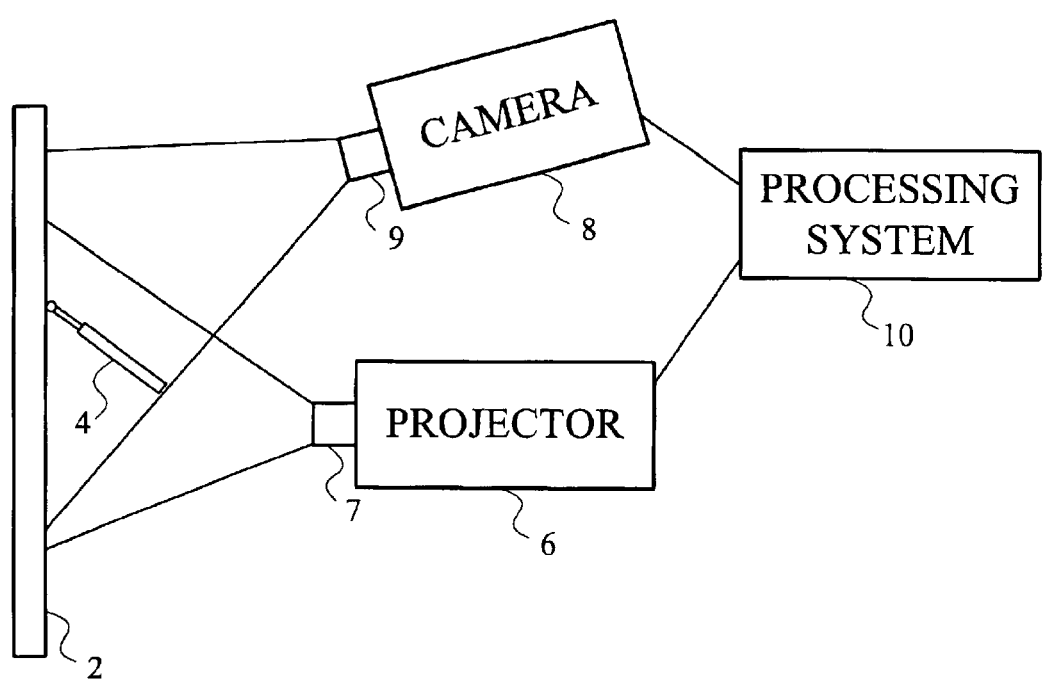
FIG. 1A is a block diagram illustrating a conventional projector and camera arrangement in a whiteboard system.
Figure 1B:
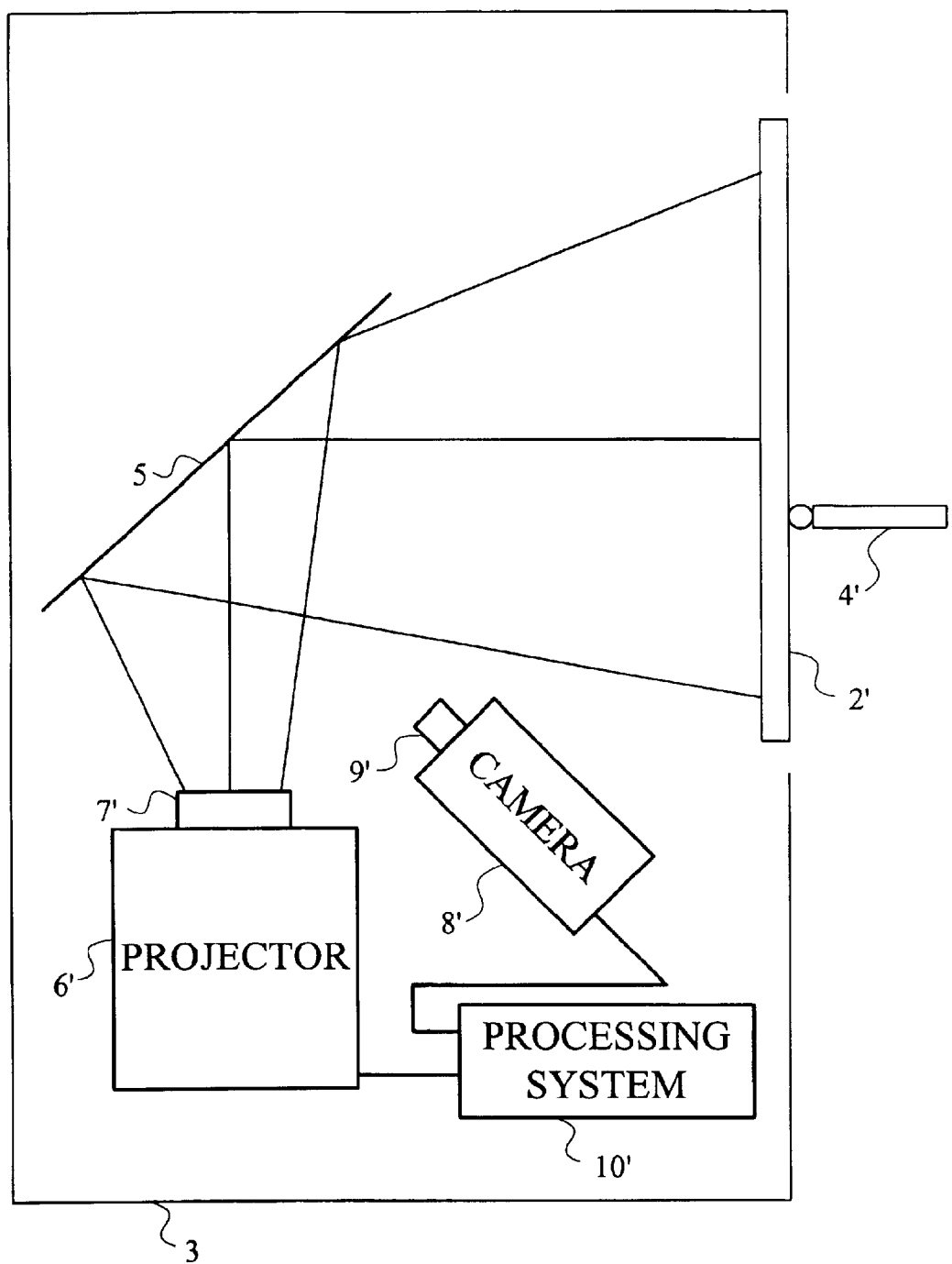
FIG. 1B is a block diagram illustrating another conventional projector and camera arrangement in a whiteboard system.

The present invention will be explained below in the context of various illustrative passive touch-sensitive optical marker structures that may be used in an electronic whiteboard system. However, it is to be understood that the present invention is not limited to any particular optical marker structure. Rather, the invention is more generally applicable to any reflective type optical marker (e.g., stylus shaped and configurations designed to fit on a finger of the user, as well as other possible configurations) for use in accordance with an electronic whiteboard system in which it is desirable to integrate passive touch-sensitive capabilities (i.e., selective exposure capabilities), as will be explained in detail below. In the following drawings, elements with the same reference numerals in different figures have the same functions unless otherwise specified.

Figure 2:
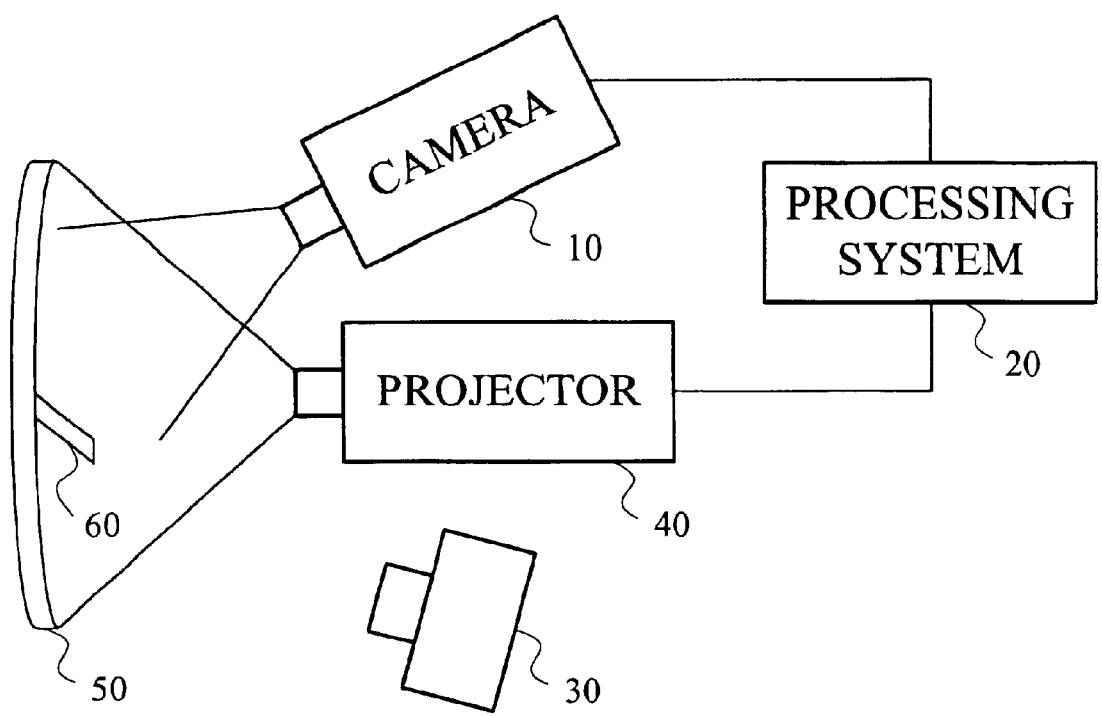
FIG. 2 is a block diagram illustrating a projector and camera arrangement in a whiteboard system utilizing a stylus-shaped passive touch-sensitive optical marker according to an embodiment of the present invention.

Referring initially to FIG. 2, a block diagram illustrates a general overview of a projector and camera arrangement in a whiteboard system utilizing a passive touch-sensitive optical marker according to an embodiment of the present invention. The system shown in FIG. 2 is a front-projection arrangement. However, the present invention is not limited to front-projection systems but rather is applicable to rear-projection systems, as well as other possible arrangements. In any case, as shown, the whiteboard system of FIG. 2 includes a camera 10, a processing system 20, an irradiation device 30, a projector 40, a whiteboard screen or data entry surface 50, and a passive touch-sensitive optical marker 60 (also referred to as a reflective device or lightpen).

Camera 10 observes the passive optical marker 60 which is irradiated by one or more signals generated by irradiation device 30. In a preferred embodiment, irradiation device 30 is closely aligned with camera 10, and passive optical marker 60 has retro-reflective properties so as to maximize the reflected signal strength. Irradiation device 30 may be connected to processing system 20 to receive control or power signals therefrom.

The camera 10 then sends unprocessed video frames captured while observing the optical marker 60 to be processed by processing system 20. Processing system 20 then processes the information it receives regarding the optical marker location and pen-up/pen-down status and provides its own output signal to the projector 40. The pen-up/pen-down status indicates whether the optical marker is in contact with the writing surface (pen-down) or whether the optical marker is not in contact with the writing surface (pen-up). Typically, in the pen-up position, the user would not want the location of the optical marker tracked by the camera. However, even in the pen-up state, the camera can optionally still be used to sense gestures made with the hand and arm. In the pen-down state, the projector 40 projects the final image (writing) on the screen 50 in accordance with the signal received from processing system 20. Alternatively, camera 10 may process the information it receives and forward a signal to the processor.

The processing system 20 includes one or more processors, associated memory and various input/output devices for coordinating the functions performed by the whiteboard screen 50, the optical marker 60, the projector 40 and the camera 10. It is to be appreciated that the term "processor" as used herein is intended to include one or more processing devices, e.g., a CPU (central processing unit) or other processing circuitry, which may be utilized in a computer system employed in conjunction with the invention. Also, it is to be understood that each processor has memory associated therewith such as, for example, RAM, ROM, flash memory, a fixed memory device (e.g., hard drive), or a removable memory device (e.g., diskette). In addition, the term "input/output devices" as used herein is intended to include, for example, one or more input devices, e.g., keyboard, mouse, etc. for entering data to the processing unit, and/or one or more output devices, e.g., CRT display and/or printer, for presenting results associated with the processing unit. It is also to be understood that the term "processor" may refer to more than one processing device and that various elements associated with a processing device may be shared by other processing devices. Accordingly, software instructions or code for performing whiteboard system operations may be stored in one or more of the associated memory devices (ROM, fixed or removable memory) and, when ready to be utilized, loaded into RAM and executed by a CPU.

In accordance with a preferred embodiment of the invention, the presence and location of a reflector associated with the optical marker of the present invention in the field of view of the camera is estimated by a "computer vision" technique, as is known in the art, although various other methods may be used. The field of computer vision, which is part of the larger field of "artificial intelligence," deals with the computer interpretation of the physical world around us using capture of visible or invisible light. Important tasks dealt with by "computer vision" algorithms are image segmentation ("what objects are in a scene"), registration ("how do the various captured images relate to one another in space and time"), photogrammetry and shape recognition ("what shape do the objects have and do they match with one the system has been made aware of before"). In the context of electronic whiteboard systems, a computer vision task referred to as "tracking" is used. Tracking involves following an object in space once the object has been found. Finding the object in the scene is commonly done in a separate well-known object acquisition phase. In the whiteboard case, the object is an optical marker and the vision algorithm estimates the location of the captured image of the light supplied by irradiation device 30 and reflected by the optical marker 60.

Processing system 20 provides the required power to implement the computer vision algorithm in connection with tracking the optical marker 60 in accordance with the present invention, as described above. Processing system 20 processes the signal from camera 10 and provides the signal to projector 40 for the output display in accordance with the location of the optical marker 60.

Irradiation device 30 serves as a light emitting source and provides the infrared (IR) light which is reflected by a reflector on the passive touch-sensitive optical marker 60 and detected by an IR sensor housed within camera 10. Irradiation device 30 may include, e.g., a bank of light emitting diodes (LEDs). After passing through an IR-transmitting, visible-blocking filter in camera 10, the IR light is sensed by the IR sensor in camera 10. Projector 40 may be a digital projector or any other projector known to one having ordinary skill in the art. Although illustrated as physically separate units, camera 10, irradiation device 30 and projector 40 may be combined into a single unit. Also, as shown in FIG. 2, the whiteboard screen 50 may be non-planar. Additionally, the logical functions of camera 10, projector 40, irradiation device 30 and processing system 20 may be performed by hardware that is housed within a single physical enclosure.

Figure 3:
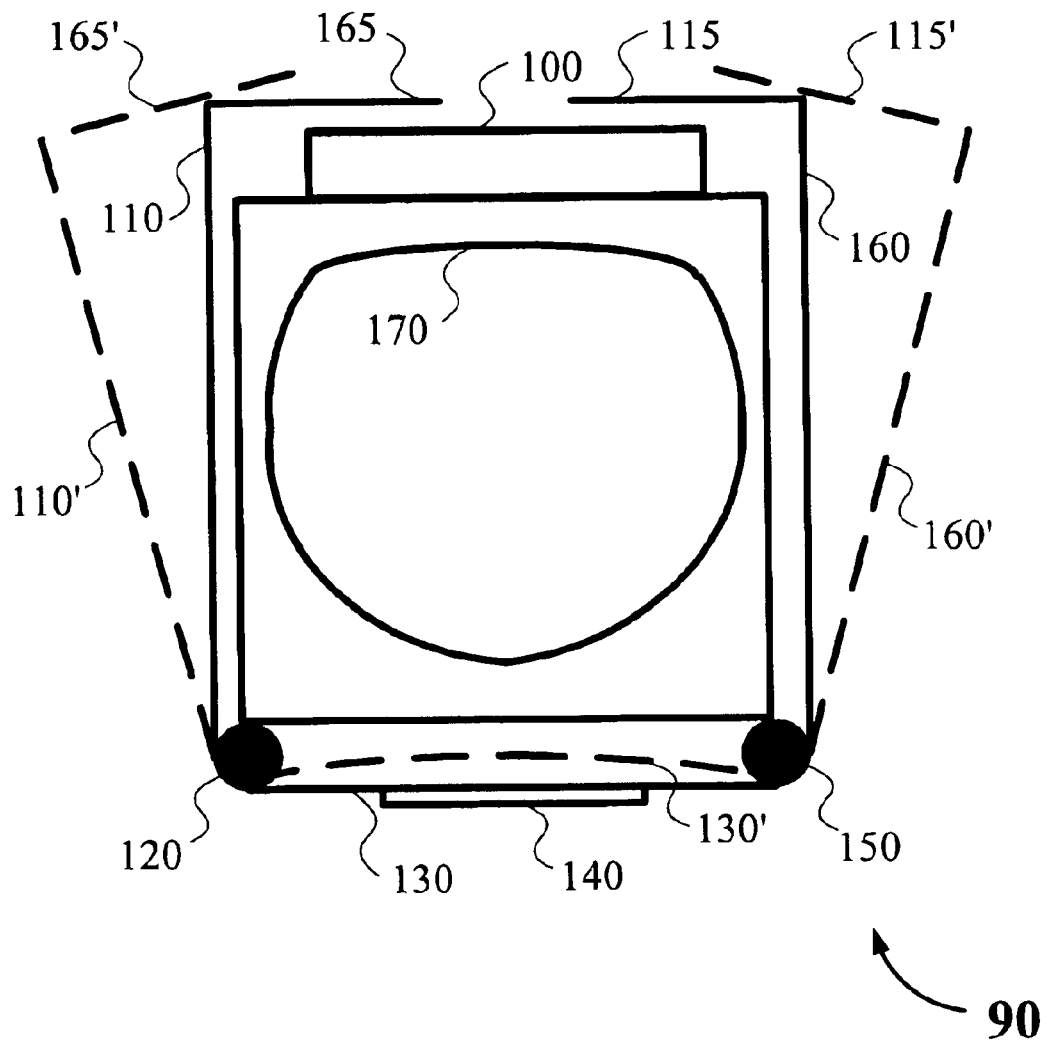
FIG. 3 is a side view in cross-section illustrating a fingertip version of the passive touch-sensitive optical marker in accordance with the present invention.

Referring now to FIG. 3, a side view of a fingertip version of the passive touch-sensitive optical marker in accordance with the present invention is illustrated in cross-section. This embodiment of an optical marker in accordance with the present invention uses the principle of covering and uncovering (selectively exposing) a diffusely reflective or retro-reflective patch to indicate the pen-up and pen-down state of the optical marker. The optical marker assembly 90 illustrated in FIG. 3 includes a reflective patch 100, a pair of side walls 110 and 160 having respective top sections 165 and 115, respective hinges 120 and 150, a bottom wall 130, and a surface-contacting patch 140. Optical marker assembly 90 is configured to be worn over a finger tip 170. Preferably, the term "reflective" as used herein refers to "diffusely reflective" and/or "retro-reflective."

Patch 140 is preferably composed of a tribological material, such as Teflon(R), to reduce the coefficient of friction between the patch 140 and the surface coming into contact with patch 140 such that optical marker assembly 90 is able to glide easily over surfaces such as a whiteboard. Alternatively, patch 140 may be formed of felt to approximate the feel of a dry erase marker. In the case of patch 140 being made of felt, the felt may be connected to a supply of non-marking clear liquid, such as water, to assure good tribological properties in combination with whiteboard surfaces.

The patch 140 is attached to the bottom wall 130. Bottom wall 130 is connected to the side walls 110 and 160 through hinges 120 and 150. Side walls 110 and 160 include top sections 165 and 115 which are substantially orthogonal extensions of side walls 110 and 160. Top sections 115 and 165 are configured to selectively cover and expose reflective patch 100. That is, in a relaxed state in which no pressure is applied to patch 140, the side walls 110 and 160 lie parallel to each other and top sections 115 and 165 cover the reflective patch 100. Upon application of pressure to patch 140 (such as, e.g., by pressing the optical marker assembly 90 against a whiteboard), the bottom wall 130 buckles inward as indicated by reference numeral 130' causing the hinged side walls as indicated by reference numerals 110' and 160' to rotate about hinges 120 and 150 thus causing top sections as indicated by reference numerals 115' and 165' to move away from reflective patch 100, thereby exposing reflective patch 100.

With reference back to FIG. 2, when optical marker assembly 90 (corresponding to optical marker 60 in FIG. 2) is irradiated with infrared light such as provided by irradiation device 30, reflective patch 100 reflects the infrared radiation back to camera 10 such that the camera and processing system 20 can determine the location of the reflective patch 100 (using the object acquisition and tracking technology of computer vision mentioned above). Upon release of the pressure applied to patch 140, the optical marker assembly 90 reverts to its relaxed and thus non-reflective state whereby the side walls 110 and 160 are again parallel to each other and top sections 115 and 165 cover the reflective patch 100.

Advantageously, in accordance with the present invention, optical marker assembly 90 does not require any of the electronic components required with the conventional optical markers. Accordingly, optical marker assembly 90 is less expensive as compared to the conventional optical markers.

U.S. patent application Ser. No. 09/644,980 filed on Aug. 18, 2000 discloses a passive optical marker and is incorporated by reference herein. The passive optical marker also requires a camera that responds to IR, as in the active optical markers. However, in the passive marker based system, there is a bright IR source which illuminates the whiteboard. Each participant in the whiteboard session wears an IR reflector on his/her hand in an area that executes the motions of a pen during writing. As with all front-projection systems, care must be taken that the reflective marker or markers are visible to the camera. That is, the reflector may typically be worn over the tip of the index finger using a band. The reflector reflects diffusely such that its orientation is of little consequence to the reflected signal strength. It is to be appreciated that there is no selective disclosure of the reflector described in the '980 application.

Figure 4:
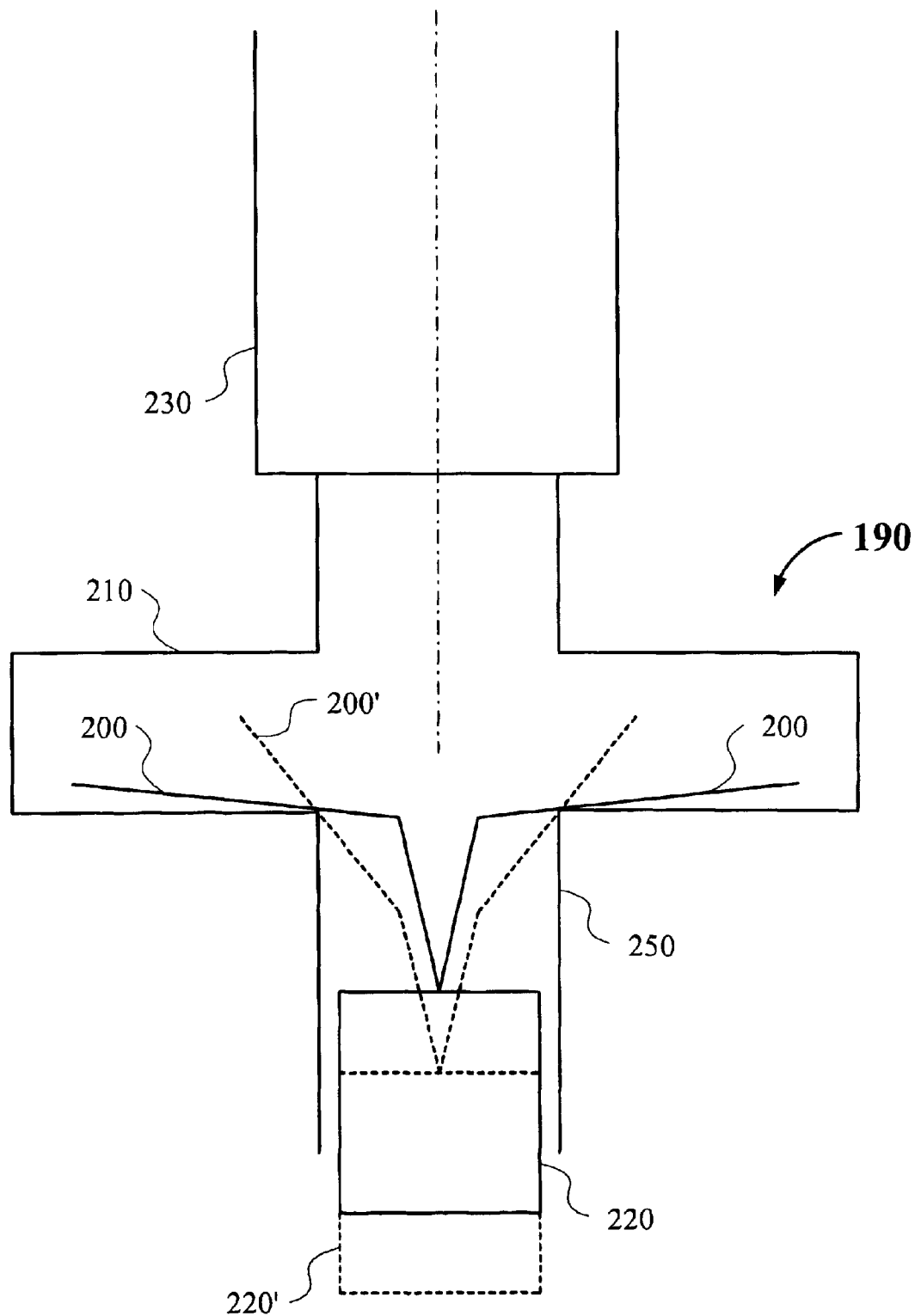
FIG. 4 is a side view illustrating a stylus version of the passive touch-sensitive optical marker in accordance with the present invention.

Referring now to FIG. 4, another embodiment of a passive touch-sensitive optical marker in accordance with the present invention is illustrated. The optical marker assembly 190 includes reflective surface element 200, window 210, a spring (not shown) and element 220. The optical marker assembly 190 illustrated in FIG. 4 utilizes the principle of alternately exposing and not exposing a reflective surface of element 200 so that it alternately becomes visible and not visible to a camera system that observes the reflective surface. Element 220 is positioned on a distal end of optical marker 190 and is the point of contact with a writing surface, such as a whiteboard. A spring (not shown) biases reflective surface element 200 into its unexposed state (as indicated by the dotted line in FIG. 4 and referred to by reference numeral 200'). As element 220 is pushed against a writing surface, such as a whiteboard, the force of the spring which pushes the element 220 distally is counteracted and the reflective surface element 200 is moved proximally from its prior position indicated by a dashed line and referred to by reference numeral 200'.

By having a narrow barrel 250, considerable mechanical amplification can be obtained so that a small displacement of element 220 (element 220 in a non-displaced state is referred to as 220') can cause a significant change in IR reflection. Due to the configuration of window 210, the element containing the reflective surface 200 expands within window 210. Window 210 is formed of a transparent material to allow transmission of IR light, and to allow reflections from the reflective surface 200 to be visible to a detector such as a camera system.

The optical marker assembly 190 may be configured to fit within the end of a barrel of a pen. FIG. 4 illustrates such a configuration wherein the optical marker assembly 190 is connected to the shank of a pen 230. The optical marker assembly 190 may be formed in different configurations to fit a particular application.

Figure 5A:
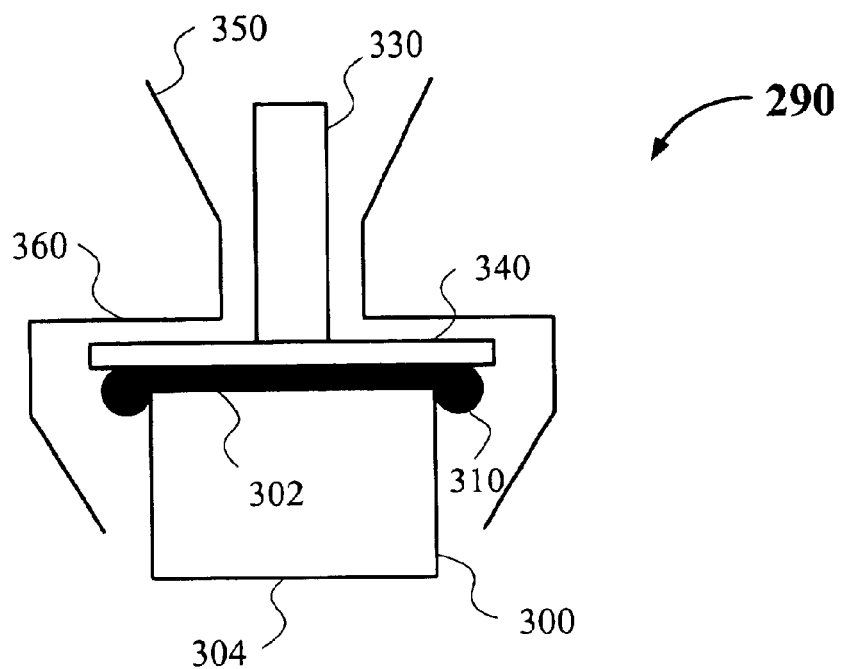
FIG. 5A is a cross-sectional view illustrating another embodiment of an optical marker in accordance with the present invention in a relaxed state.
Figure 5B:
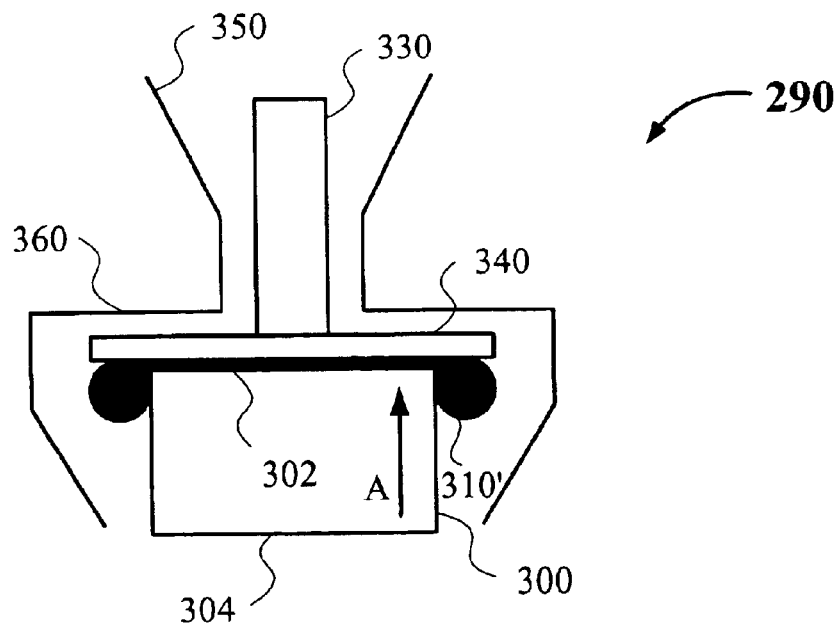
FIG. 5B is a cross-sectional view illustrating another embodiment of an optical marker in accordance with the present invention in an activated state.

FIGS. 5A and 5B illustrate yet another embodiment of an optical marker in accordance with the present invention. The embodiment illustrated in FIGS. 5A and 5B is based on the principle of reflection modulation which is achieved by changing the thickness of a substance (such as a liquid or gel) that has a semi-opaque characteristic with respect to radiation. FIGS. 5A and 5B are cross-sectional views illustrating a generally axi-symmetric embodiment of the present invention. FIG. 5A illustrates optical marker 290 in a relaxed state, wherein, in FIG. 5B, optical marker 290 is illustrated in an active state to allow emitted IR light to be reflected back to the camera, as will be discussed in further detail below.

Optical marker 290 includes a plug 300, a substance layer 310, a shank 330, a transparent plate 340, a housing 350 and a window 360. Plug 300 is positioned at a distal end of optical marker 290 so that the user may apply pressure against a writing surface such as a whiteboard.

Plug 300 is preferably coated with a diffusely reflective or retro-reflective layer on a proximal end 302 and a tribological material on a distal end 304. Substance layer 310 may be a fluid layer and is preferably clear in the pen-down state. Substance layer 310 is configured to at least partially block the IR light which is transmitted through window 360 and transparent plate 340. Shank 330 extends from plate 340 and may be connected to a device such as a stylus so that the optical marker 290 can be held as a conventional writing pen. Window 360 is formed of a transparent material and is integral with housing 350. Housing 350 envelopes the components of optical marker 290.

FIG. 5A illustrates optical marker 290 in a relaxed state, with a thick substance layer 310. In the relaxed state, plug 300 is urged distally, allowing more partially opaque substance to aggregate between plug 300 and plate 340. When plug 300 is forced proximally, as illustrated by arrow A in FIG. 5B, the substance layer 310 is thinned by the applied proximal force, allowing more radiation to be reflected through transparent plate 340 and through transparent window 360 by a reflecting surface of plug 300. Because the reflector needs to be the most reflective object in the field of view of the camera, the system benefits by avoiding whiteboards that reflect back to the camera at the radiation wavelength of interest.

In an alternative embodiment, plug 300 may incorporate a piezoelectric element such that, upon application of pressure, an electric field is generated across the substance layer 310. In this case, the substance layer 310 responds to the electric field by changing its reflectivity. A substance layer such as one manufactured by E-Ink Corporation from Cambridge, Mass. performs such a function. When a piezoelectric field is created across the substance layer, a change in thickness is no longer essential.

Each of the optical markers discussed above may be configured to communicate a multitude of additional information. For example, the modulation of the light source can carry a user-specific code which identifies the user. That is, the reflective properties of the optical markers may be made user-specific by choosing IR reflectors with anisotropic (non-isotropic) properties, e.g., so as to scatter the reflected light in a unique pattern. The latter may be accomplished by using custom-textured reflective surfaces such as holograms. The optical markers in accordance with the present invention may also communicate additional information such as the contact force against the writing surface, the desired ink color, the identity of the pen, the proximity to the writing surface, etc. Modulation of the reflected IR signal may be achieved by varying the contact force of writing.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An optical marker for use in accordance with an electronic whiteboard system, the electronic whiteboard system including a light emitting source, the optical marker comprising:

a reflector for reflecting at least a portion of light emitted from the light emitting source when exposed thereto; and means for selectively allowing the reflector to be exposed to the light emitted by the light emitting source.

2. The optical marker as recited in claim 1, wherein the reflector has a non-isotropic surface.

3. The optical marker as recited in claim 2, wherein the non-isotropic surface of the reflector is optically distinguishable from other reflectors illuminated by the light emitting source.

4. The optical marker as recited in claim 1, wherein at least one reflective property of a surface of the reflector identifies at least one characteristic associated with the optical marker.

5. The optical marker as recited in claim 1, wherein the means for selectively allowing the reflector to be exposed to light includes a patch and one or more side walls, wherein the patch is operatively connected to the one or more side walls such that when pressure is applied to the patch, the one or more side walls are forced away from the reflector thereby exposing the reflector to light.

6. The optical marker as recited in claim 1, wherein the means for selectively allowing the reflector to be exposed to light includes a first element for contacting a data entry surface of the electronic whiteboard system and a second element, wherein the second element at least partially prevents the reflector from being exposed to light when the second element is in a first position, and wherein the first element is positioned adjacent to the second element such that when pressure is applied to the first element the reflector is exposed to light.

7. The optical marker as recited in claim 1, wherein the optical marker is utilized by a user in a manner such that the means for selectively allowing the reflector to be exposed to light comes into contact with a data entry surface of the electronic whiteboard system when the user enters data and, in accordance with such data entry, light emitted by the light emitting source is reflected from the reflector to an image capture device of the electronic whiteboard system, such that the image capture device can capture the reflected light and track a location of the reflector, and such that an image projection device of the electronic whiteboard system can project an image which is viewable on the surface, in proximity of the position of the reflector, and representative of the data entered in accordance with the reflector on the data entry surface.

8. The optical marker as recited in claim 1, wherein the optical marker is configured to be worn on a finger of a user.

9. The optical marker as recited in claim 1, wherein the optical marker is configured to be connected to a pen.

10. The optical marker as recited in claim 1, wherein the light emitted by the light emitting source is infrared light.

11. The optical marker as recited in claim 1, wherein the reflector is exposed to light emitted by the light emitting source to indicate a pen-up or pen-down status of the optical marker.

12. The optical marker as recited in claim 1, wherein the reflector is exposed to light emitted by the light emitting source to indicate a location of the optical marker.

13. A method of writing in accordance with an electronic whiteboard system, the method comprising the steps of:

emitting light from a light emitting source associated with the electronic whiteboard system toward a reflector associated with an optical marker of the electronic whiteboard system;

the reflector reflecting at least a portion of light emitted from the light emitting source when the reflector is exposed to the light; and selectively allowing the reflector to be exposed to the light emitted by the light emitting source through means of the optical marker.

14. The method as recited in claim 13, further comprising the steps of capturing the reflected light and tracking a position of the reflector therefrom.

15. The method as recited in claim 14, further comprising the step of projecting an image of the tracked position of the reflector on a data entry surface associated with the electronic whiteboard system.

16. The method as recited in claim 13, wherein the step of selectively allowing the reflector to be exposed to light comprises alternately covering and uncovering the reflector thereby blocking the transmission of light to the reflector.

17. The method as recited in claim 13, wherein the reflector is exposed to the light emitted by the light emitting source to indicate a pen-up or pen-down status of the optical marker.

18. The method as recited in claim 13, wherein the reflector is exposed to the light emitted by the light emitting source to indicate a location of the optical marker.

19. The method as recited in claim 13, wherein the light emitted by the light emitting source is infrared.

* * * * *